Patented Feb. 5, 1929.

1,701,272

UNITED STATES PATENT OFFICE.

JOHN J. NAUGLE, OF BROOKLYN, NEW YORK.

ELECTRIC FURNACE PRODUCT.

No Drawing. Application filed April 21, 1923. Serial No. 633,641.

My present invention relates to electric furnace products, particularly in the form of comminuted carbonaceous material characterized by a high degree of purity and high electrical conductivity, and aims to devise products of the character described which shall have a degree of purity much higher than the raw materials from which such products may be derived, and which shall possess, at the same time, a degree of electrical conductivity also much higher than the conductivity of such raw materials. In one of its forms, my present invention relates more particularly to an electric furnace product derived from comminuted carbonized lignin residues which are obtained by carbonizing the cooking liquors derived from the treatment of wood by the alkali (soda) process to obtain wood pulp, such product being in the form of an activated decolorizing carbon having a very high electrical conductivity corresponding to a high degree of activation and decolorizing power.

In the accompanying specification I shall describe an illustrative embodiment of the product of the present invention. It is, however, to be clearly understood that my invention is not limited to the specific form thereof herein described for purposes of illustration only.

In preparing the form of product comprising the aforesaid illustrative embodiment of the present invention, I prefer to use the raw material already referred to and comprising the carbonized residues obained by carbonizing the cooking liquors derived from the treatment of wood by the alkali (soda) process in the manufacture of wood pulp. While other material may be used to advantage, and while the product of the present invention may be derived also by revivifying spent decolorizing carbon, I prefer to use the raw material first designated, since I find that I am enabled to obtain a very superior product therefrom.

The average analysis of such carbonized lignin residues, which should be in comminuted or finely divided form, is as follows:

*Analysis of comminuted carbonized lignin residues.*

| | Per cent. |
|---|---|
| Carbon | 90 |
| Ash | 10 |

*Analysis of ash.*

| | Per cent. |
|---|---|
| Silicious matter | 0.13 |
| Silica | 0.75 |
| Ferric oxide | 0.84 |
| Alumina | 0.47 |
| Lime, CaO | 0.23 |
| Magnesia, MgO | 0.11 |
| Chlorine as chlorides | 0.47 |
| Sulphuric anhydride | 2.65 |
| Carbon dioxide | 1.00 |
| Alkalies (by diff.) | 3.85 |
| | 10.00 |

This material contains certain volatile matter, and also certain fusible mineral substances which are of high resistivity and serve substantially to reduce the conductivity of the raw material employed.

I now subject the raw material specified above to a treatment which will substantially expel all volatile substances therefrom, and will also serve to eliminate the fusible mineral substances present in such material which act to increase its resistivity and thus to decrease its degree of activation and decolorizing power. While various methods may be used for this purpose, I prefer to use the method described and claimed in one of my copending applications filed of even date herewith.

In accordance with the method described and claimed in the application last referred to, I heat a mass of the raw material specified above in such a manner as to expel the volatile substances and to fuse the mineral substances present therein, said latter substances being characterized by low electrical conductivity, so as to subsequently remove such fused mineral substances in the form of sintered granules or clinkers. This I may do by passing an electric current of regulated density through the mass of the raw material until the mineral substances present therein have been fused. The density of the electrical current should be such as to cause such mineral substances to aggregate or sinter together in the formation of the clinkers or granules referred to.

The fused mineral substances may now be removed in any suitable manner so as to yield a product which is characterized by a very high degree of electrical conductivity, amounting often to as much as five times the conductivity of the raw material employed, and characterized, further, by a very substantial reduction in the mineral content of the final product, which mineral content is often reduced to as little as one-fourth of the original mineral content of the raw material employed.

I have discovered that the degree of activation or decolorizing power of the final product is a function of its conductivity, increased conductivity indicating increased activation and decolorizing power, and vice versa. Accordingly, by the removal of the fusible mineral substances, which are of comparatively high electrical resistance, and which, therefore, serve to reduce the electrical conductivity and thus the degree of activation and decolorizing power of the final product, I am enabled to effect a very remarkable increase in the degree of activation and decolorizing power of the material treated in accordance with the process outlined above. This product may, if desired, be made in an apparatus of the form described and claimed in another of my copending applications filed of even date herewith.

The resulting product possesses many advantages for the intended purpose, since it is comparatively cheap, may be economically produced, and possesses the desirable qualities of a high degree of purity and of high electrical conductivity, corresponding to a high degree of activation and decolorizing power. An average analysis of the finished product is as follows:

*Analysis of final product.*

| | Per cent. |
|---|---|
| Carbon | 97.60 |
| Ash | 2.40 |

*Analysis of ash.*

| | |
|---|---|
| Calcium | 0.16 |
| Sodium, $Na_2O$ | 0.35 |
| Magnesium, $MgO$ | 0.16 |
| Chlorides $(Cl_2)$ | 0.06 |
| Sulphates $(SO_3)$ | 0.78 |
| Silica, $SiO_2$ | 0.50 |
| Iron and alumina $(Fe_2O_3, Al_2O_3)$ | 0.39 |
| | 2.40 |

It may here be stated that the carbonized lignin residues referred to herein are the residues remaining after leaching the residues obtained by carbonizing the spent or used cooking liquors derived in the treatment of wood by the alkali (soda) process in the production of wood pulp; and that the terms "activation" and "decolorizing" or their equivalents, as used in the specification and claims, include also deodorization, purification and filtration.

It may also be stated that the heat treatment to which the raw material, such as the carbonized lignin residues referred to, is subjected, serves also to volatilize a part, at least, of the more readily volatile mineral constituents of the material being treated to produce the product of the present invention. The product is thus of an unusually high degree of purity and of comparatively low specific gravity, weighing as low as about six, and up to about nine, pounds per cubic foot, whereas the raw material weighs from about eighteen, down to about ten, pounds per cubic foot. The product is also remarkably porous, of very uniform quality, and of very high efficiency. Since I prefer, also, that the carbon of the present invention shall, in the course of its preparation, or otherwise, be deprived of a substantial part of the "fines" or finer particles, the presence of which would tend to make the product unstable, to render it more combustible and to diminish its efficiency, which "fines" usually comprise from about twenty, to about thirty, per cent of the weight of the material treated for the production of the product of the present invention, I obtain a product which may be made with a high yield, which is remarkably stable, which is less combustible than other products of a similar nature, which shows a very low percentage of loss during its manufacture, and during its use for filtration and subsequent revivification, and which tends to yield a product of constantly increasing efficiency during successive revivifications.

For the purpose of comparing the specific resistivity, or conductivity, as desired, of the raw material and of the final product, it may be stated that the total resistance of a mass of the raw material (in this case the carbonized lignin residues referred to) within a tube one inch long and one and seven-sixteenth inches in diameter, under a total pressure of one kilogram, was found to be about 167 ohms, corresponding to a resistance of about 6.28 ohms per cubic centimeter. The total resistance of a mass of the final product within a tube of the same dimensions and under a similar total pressure, was found to be about 33.5 ohms, corresponding to a resistance of about 1.26 ohms per cubic centimeter.

Another very valuable characteristic of the product of the present invention is that it is almost absolutely neutral, being neutral to phenolphthalein. This is probably the result of the manner in which the carbon is preferably produced, which consists in initially subjecting the raw material to a comparatively high temperature, which apparently converts the sulphates present in the raw material being treated, principally calcium and sodium sulphates, into sulphides, by the reducing action of the carbon, the sulphides, at a comparatively low temperature, being converted into the normal carbonates of calcium and sodium, respectively, to yield a neutral carbon. If the temperature is again raised so as to be comparatively high, the carbonates are apparently calcined and converted into the highly alkaline oxides. This is to be avoided since the neutralization of such an alkaline carbon by the addition of acid will tend to yield an acid carbon, which is highly undesirable, since acid carbons tend to invert sugar, where the carbons are used for the purification or filtration of sugar solutions, while alkaline carbons tend to form slimes which retard the rate of filtration or purification; while the carbon of the present invention, being, as it is, absolutely neutral, no slimes tend to be formed and thus a high rate of filtration or purification is possible, while the absence of acid in the carbon avoids the inversion of sugar if sugar solutions are purified or filtered through the product of the present invention.

What I claim as my invention is:

1. An electric furnace product comprising treated carbonized lignin residues having an ash content of less than about 3 per cent by weight.

2. A comminuted carbonaceous material comprising treated carbonized lignin residues having an ash content of less than about 3 per cent by weight.

3. An electric furnace product comprising a comminuted decolorizing carbon having an ash content of from about 2.40 to about 2.80 per cent by weight.

4. An electric furnace product derived from carbonized lignin residues and comprising a comminuted declorizing carbon having an ash content of from about 2.40 to about 2.80 per cent by weight.

5. An electric furnace product derived from carbonized lignin residues and comprising comminuted carbonaceous material having a resistance between 1.25 and 2.50 ohms per cubic centimeter.

6. An electric furnace product derived from carbonized lignin residues and comprising comminuted carbonaceous material neutral to phenolphthalein.

7. An electric furnace product derived from carbonized lignin residues and comprising substantially neutral comminuted carbonaceous material.

8. An electric furnace product derived from carbonized lignin residues having an ash content of less than 3% by weight.

In testimony, whereof, I have signed my name to this specification this 30th day of March, 1923.

JOHN J. NAUGLE.